Sept. 17, 1968  E. W. WEINMAN  3,402,291
METHOD AND APPARATUS OF MEASURING RESIDUAL STRESS IN
METALS AND THE AMOUNT OF A KNOWN CONSTITUENT
Filed April 6, 1966  2 Sheets-Sheet 1

INVENTOR.
Eric W. Weinman
BY
Albert F. Duke
ATTORNEY

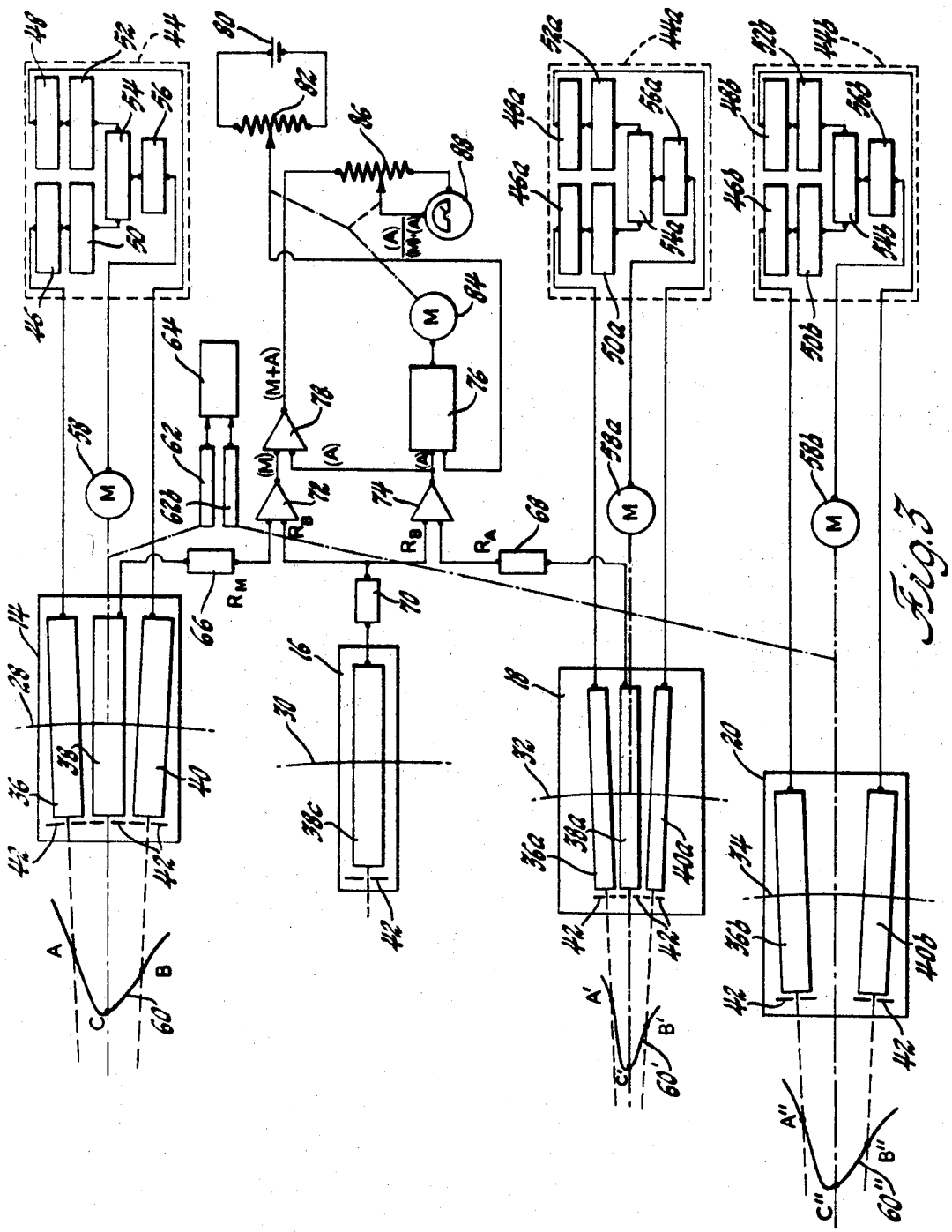

United States Patent Office 3,402,291
Patented Sept. 17, 1968

3,402,291
METHOD AND APPARATUS OF MEASURING RESIDUAL STRESS IN METALS AND THE AMOUNT OF A KNOWN CONSTITUENT
Eric W. Weinman, Birmingham, Mich., assignor to General Motors Corporation, Detroit, Mich., a corporation of Delaware
Filed Apr. 6, 1966, Ser. No. 540,543
18 Claims. (Cl. 250—51.5)

This invention relates generally to a non-destructive X-ray analysis and more particularly to a method and apparatus for measuring residual stress in metals and other crystalline materials and the amount of a second phase such as retained austenite in irons and steel by X-ray diffraction.

It is well known in the metal-treating art that the process of hardening steel produces a high temperature phase known as austenite (face-centered cubic crystalline structure) which is transformed to a hard, strong phase known as martensite (body-centered cubic crystalline structure) when the steel is rapidly cooled. The softer phase of austenite may not, however, be entirely eliminated during the quench and subsequent tempering and since the physical properties of the retained austenite are different from those of martensite, the amount of retained austenite affects the performance and durability of the part.

It is also well known that residual stresses (locked in elastic stresses) are produced as a matter of course in operations such as cold forming, welding, heat treating and grinding and are intentionally introduced in such operations as fillet rolling and shot peening. Working load stresses are superimposed on these residual stresses. Consequently, compressive residual stresses generally enhance and tensile residual stresses generally detract from the life of parts.

Because residual stress and percent retained austenite are important factors determining the life of a part, it is desirable to have some means of rapidly and accurately measuring these quantities. At present, X-ray diffractometers are utilized to obtain intensity versus diffraction angle ($2\theta$) recordings. For stress determination, it is necessary to locate the $2\theta$ position of the martensite peak at two separate $\psi$ angles (i.e., angle between specimen and diffracting plane normals). Where diffraction peaks are broad as is the case with a specimen such as hardened steel, the diffraction angle location of the peak is difficult to ascertain from such recordings and moreover, the measured diffraction peak is displaced from the true peak position by diffraction angle dependent factors. Prior art methods of obtaining the true peak position from such recordings are excessively time consuming requiring a trained operator 15 to 30 minutes to obtain a single stress measurement and have thus severely limited the application of X-ray stress analysis to production control. Likewise, the present methods of determining percent retained austenite such as the integrated peak method require approximately 50 minutes per determination.

The present invention advances the measurement of residual stress and percent retained austenite from a slow laboratory procedure to automatic determination within seconds permitting continuous monitoring of residual stress and percent retained austenite in production parts. In accordance with the present invention, two X-ray sources simultaneously radiate first and second X-ray beams at selected angles of incidence with a common specimen area. Individual detector means are provided for measuring background intensity and for automatically locating the true peak positions of the first X-ray beam as diffracted from martensite and austenite planes parallel to the specimen surface and the true peak position of the second X-ray beam as diffracted from equivalent martensite planes oblique to the specimen surface. Means are provided for indicating residual stress as a function of the diffraction angle locations of the martensite diffraction peaks and means are provided for indicating percent retained austenite as a function of the relative intensities of the austenite and martensite diffraction peaks, that is, the measured intensity less the background intensity.

A more complete understanding of the present invention may be had from the following detailed description which should be read in conjunction with the drawings in which:

FIGURE 3 is a schematic diagram of the detectors and associated output circuitry.

Figure 1:
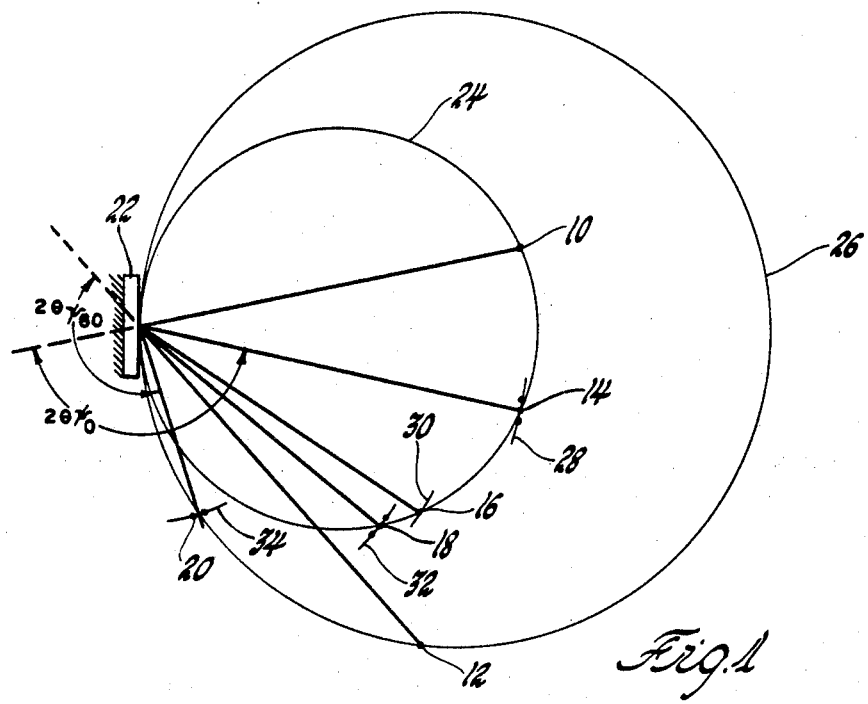
FIGURE 1 is a diagrammatic layout of the elements of the apparatus of the present invention.

Referring now to the drawings and initially to FIGURE 1, a diagrammatic layout of the apparatus of the present invention is shown. The apparatus includes a pair of X-ray sources 10 and 12 and a plurality of X-ray detectors 14, 16, 18 and 20. Preferably chromium radiation sources are used with the detector being provided with a vanadium foil filter. A hardened steel specimen 22 is fixedly mounted as are the sources 10 and 12 on supoprt means (not shown). The source 10 and the detectors 14, 16 and 18 are located on a parafocus circle 24 which is tangential to the specimen 22. The source 12 and the detector 20 are located on a second parafocus circle 26 which is also tangential to the specimen 22. The detectors 14, 16, 18 and 20 are movably mounted on separate goniometers 28, 30, 32 and 34 which have their centers of rotation at the point of tangency of the parafocus circles 24 and 26 with the specimen 22. While the detectors 14, 16, 18 and 20 are illustrated as located in a single plane, the detectors 16 and 18, for example, may be located above or below the plane of the parafocus circle 24 at an intersection of the parafocus sphere and diffraction cone if the size or shape of the components create a space interference.

Figure 2:
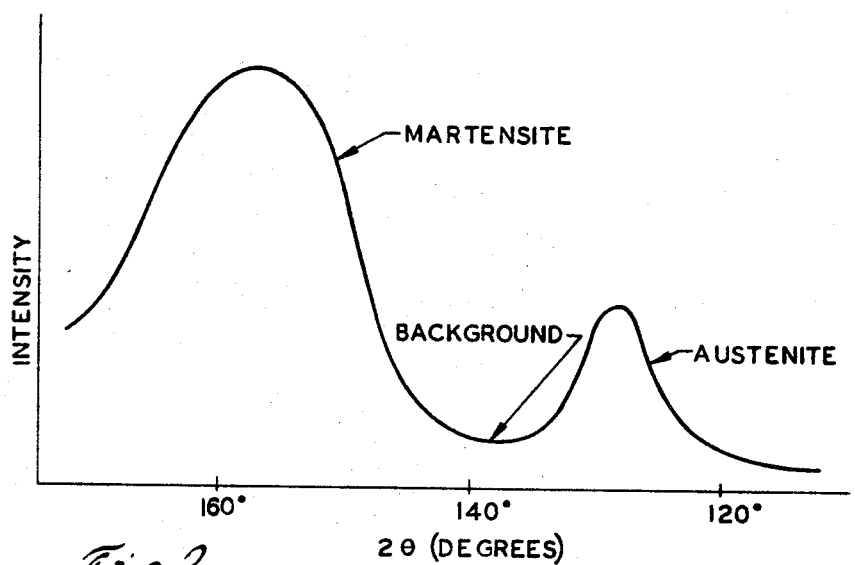
FIGURE 2 shows a typical intensity versus diffraction angle curve for hardened steel using chromium radiation and vanadium filtering.

The determination of residual stress involves location of the true peak position of X-ray beams diffracted from equivalent crystallographic planes having different angular orientation with respect to the surface of the specimen. Preferably, the angular orientations are as wide apart as possible and are commonly 0° and 60°. As shown in FIGURE 2, martensite planes having a (211) Miller Index diffract at about 156° and austenite planes having a (220) Miller Index diffract at about 128° when chromium radiation and vanadium filtering are used. In order to measure the intensity of X-rays diffracted from the (211) martensite planes parallel to and at 60° to the specimen surface, the source 10 and the detector 14 are located respectively at approximately 12° above and below the normal to the surface of the specimen 22 while the source 12 and the detector 20 are located respectively at approximately 12° above and below a line having an angular orientation of 150° relative to the surface of the specimen 22. The detectors 14 and 20 are thus located at diffraction angles of approximately 156° with respect to X-rays from the sources 10 and 12 respectively. In order to measure the intensity of X-rays diffracted from the (220) austenite planes parallel to the surface of the specimen 22, the detector 18 is located approximately 40° below the normal to the surface of the specimen 22 at a diffraction angle of approximately 128° with respect to X-rays from the source 10. The detector 16 measures the background intensity of X-rays diffracted from planes parallel to the specimen surface and is preferably located between the martensite and austenite peak position. A suitable location is at a diffraction angle of 135°.

Referring now to FIGURE 3, a schematic diagram of the detectors and associated circuitry is shown. The detectors 14 and 18 each house three counter tubes 36, 38, 40 and 36a, 38a, and 40a. The detector 20 houses two counter tubes 36b and 40b and the detector 16 houses a single counter tube 38c. Each counter tube is provided with a mask 42 to insure X-ray intensity measurements at discrete diffraction angles in the diffracted X-ray beam as indicated by the dash lines. The counter tubes 38 and 38a are responsive to X-rays diffracted at an angle midway between the angles of diffraction at which the counter tubes 36, 36a, and 40, 40a are responsive. The outputs from the counter tubes 36, 40 and 36a, 40a, and 36b, 40b are fed respectively to control circuitry 44, 44a and 44b. The control circuitry 44 includes rate meters 46 and 48 responsive to the output of counter tubes 36 and 40 respectively for developing a D-C voltage proportional to the intensity measured. The D-C voltage outputs from the rate meters 46, 48 are corrected for diffraction angle dependent factors in correction circuitry 50 and 52 and then fed to a differential amplifier 54. The output from the differential amplifier 54 is fed to a driver amplifier 56 which drives a motor 58 to position the detector 14 to a diffraction angle location where the corrected output of the counter tubes 36 and 40 are equal. The intensity of the diffracted beam impinging upon the counter tube 36 is depicted at point A on an intensity versus diffraction angle curve 60. Likewise, the counter tube 40 detects the intensity at the point B. The counter tube 38, being responsive to the intensity at a diffraction angle midway between the points A and B measures the intensity at point C. The control circuitry 44a and 44b includes rate meters 46a, 48a, 46b, 48b and correction circuitry 50a, 52a, and 50b, 52b. Differential amplifiers 54a and 54b and driver amplifier 56a and 56b control the operation of motors 58a and 58b respectively to position the detectors 18 and 20 in the same manner as the circuitry 44 controls the motor 58. The counter tubes 36a, 38a, and 40a thus measure the intensity at points A', C' and B' respectively on intensity versus diffraction angle curve 60'. The counter tubes 36b and 40b measure the intensity at points A'' and B'' respectively on intensity versus diffraction angle curve 60''. The diffraction angle location midway between the points A'' and B'' passes through the curve 60'' at the point C''.

The correction circuitry 50, 50a, 50b and 52, 52a, 52b include potentiometers which may be manually adjusted to reduce the D-C output of the rate meters 46 and 48 by known amounts to correct the measured intensity output of the counter tubes for diffraction angle dependent factors. The factors which effect X-ray intensity include the Polarization intensity factor which arises because the incident X-ray beam is unpolarized, the Lorentz factor which arises from certain geometrical consideration resulting from the counter tube receiving only a portion of the total integrated intensity of the reflections from a given family of planes in the specimen and the Absorption factor which arises from the variation in the main path length of the X-rays within the sample with variations in the angle of diffraction. A tabulation of the combined Polarization, Lorentz and Absorption factors for different diffraction angles $2\theta$ and $\psi$ angles of 0° and 60° angles can be found in most texts concerned with X-ray diffraction and are also published by the Society of Automotive Engineers. For $\psi=0°$ the mean path length is constant and thus the absorption is constant and independent of the diffraction angle. Therefore, the correction circuitry associated with the detectors 14 and 18 adjusts the output of the rate meters in accordance with the combined Polarization and Lorentz factor only. For $\psi=60°$ the mean path length changes and the absorption changes with diffraction angle. All three factors are therefore considered in the correction circuitry 50b and 52b which is associated with the detector 20.

It is desirable under certain circumstances to correct the output of only one rate meter in the control circuit in order to provide a higher input to the driver amplifier. For example, the correction circuit 50 may be eliminated so that the output of the rate meter 46 is fed directly to the differential amplifier 54 while the correction circuitry 52 is adjusted to reduce the output of the rate meter 48 by an amount equal to the quotient of the correction factors required at the particular angular locations of the counter tubes 36 and 40. Because the correction factors vary approximately linearly with diffraction angle changes in the range of 150°–160° which is a primary interest when dealing with a hardened steel specimen, a fixed potentiometer setting in the correction circuitry 52 has proved acceptable. With either correction set up, the motor 58 will position the counter tubes 36 and 40 at diffraction angle locations of equal corrected intensity.

Electromechanical transducers 62 and 62b each of which preferably comprises a battery connected across a potentiometer having a movable tap driven by the motors 58 and 58b respectively develop output voltages which represent the angular positions of points C and C''. These outputs are fed to a recorder 64 as positive and negative inputs to provide a readout of residual stress as a function of the difference of the diffraction angles represented by points C and C''.

In accordance with the present invention, the percent retained austenite measurements are based on the relative intensities detected by the counter tubes 38 and 38a less the background intensity detected by the counter tube 38c. When the detectors 14, 18 and 20 are moved to a null position, the counter tubes 38 and 38a measure the intensity at the points C and C'. The background intensity at an angle of approximately 135° is measured by the counter tube 38c. The outputs of the counter tubes 38, 38a and 38c are fed to rate meters 66, 68, and 70 respectively. The output of the rate meter 70 designated $R_B$ is subtracted from the outputs of the rate meter 66 designated $R_M$ and the rate meter 68 designated $R_A$ in operational amplifiers 72 and 74 respectively. The output from the amplifier 74 designated (A) which is equal to austenite peak intensity minus background intensity is fed to a servo amplifier 76 and to an operational amplifier 78 where it is added to the output from the amplifier 72 which is designated (M) and is equal to martensite peak intensity minus background intensity. The servo amplifier 76 which also receives a reference input from a battery 80 and a potentiometer 82 drives a motor 84 which positions the movable tap on the potentiometer 82 and a potentiometer 86. A meter 88 is connected across the potentiometer 86 and is calibrated to read percent retained austenite as a function of $$\frac{(A)}{(M)+(A)}$$

Summarizing the operation of the apparatus with reference to FIGURES 1 and 3, simultaneous irradiation of a common surface area of the specimen 22 by the X-ray source 10 and 12 will cause the detectors 14 and 20 to seek the true diffraction angle locations of the martensite peak intensity for $\psi=0°$ and $\psi=60°$ respectively and will cause the detector 32 to seek the true diffraction angle location of the austenite peak intensity for $\psi=0°$. The recorder 64 will indicate the residual stress in the specimen as a function of the angular difference between the null positions for detectors 14 and 20 and the meter 88 will indicate the amount of retained austenite as a function of the intensities measured by the counter tubes 38, 38a and 38c.

While the invention has been described with regard to a preferred embodiment thereof, this should not be construed in a limiting sense. Modifications and variations will occur to those skilled in the art. For a definition of the invention, reference is made to the appended claims.

What is claimed is:
1. A method of determining stress in a specimen comprising the steps of simultaneously irradiating with X-rays of a predetermined wavelength first and second equivalent crystallographic planes in the specimen having different angular orientations with respect to the specimen surface,
   locating the peak intensity positions of X-rays diffracted from each plane by locating a diffraction angle midway between two diffraction angles of equal corrected intensity in each diffracted X-ray beam,
   and utilizing the peak positions so located for determining stress.

2. A method of determining stress in a specimen comprising the steps of irradiating first and second X-ray beams at two different angles of incidence with the specimen surface,
   positioning a pair of fixedly spaced intensity detecting tubes in each diffracted beam,
   converting the intensities detected to electrical signals,
   correcting the electrical signals for diffraction angle dependent factors,
   utilizing the difference in electrical signals associated with the two tubes in each pair for positioning each pair of tubes at a null position,
   detecting the diffraction angle locations midway between each pair of tubes at said null positions,
   and indicating stress as a function of the diffraction angle location detected.

3. A method of determining the percent retained austenite in a specimen containing both martensite and austenite crystalline structure comprising the steps of irradiating an area of the specimen surface with X-rays,
   locating two diffraction angles of equal corrected intensity on each side of an appropriate martensite peak,
   locating two diffraction angles of equal corrected intensity on each side of an appropriate austenite peak,
   detecting the intensity at a diffraction angle midway between each of said two diffraction angles,
   detecting the background intensity at a predetermined diffraction angle between said martensite and austenite peaks,
   and utilizing the intensities so detected for determining percent retained austenite.

4. Apparatus for locating the peak position of diffracted X-rays comprising movably mounted detector means positioned in the path of the diffracted X-rays and including first and second intensity measuring tubes responsive to X-ray intensity at first and second diffraction angles respectively,
   first and second circuit means responsive to the outputs of said first and second tubes respectively,
   at least one of said circuit means including means for correcting the measured intensity of at least one of said tubes for diffraction angle dependent factors,
   motor means responsive to the difference in output of said first and second circuit means for moving said detector means to a null position,
   and means for detecting the angular position between said first and second tubes at said null position.

5. Apparatus for determining stress in a specimen containing martensite phase of crystalline structure comprising means for simultaneously irradiating atomic planes in said specimen having first and second angular orientations with respect to the surface of the specimen,
   first and second independently movably mounted null seeking detector means responsive to X-rays diffracted from said first and second planes respectively,
   first and second control means responsive to the measured intensity outputs of said first and second detector means respectively for driving said detector means to a diffraction angle location of peak corrected martensite intensity,
   and means responsive to movement of said first and second detectors for indicating stress as a function of the diffraction angle location of said detectors.

6. Apparatus in accordance with claim 5 wherein said first and second null seeking detector means includes first and second radiation detecting tubes,
   said first and second control means comprising first and second circuit means independently responsive to the outputs of said first and second tubes respectively of each of said detector means,
   and motor means responsive to the difference in the outputs of said first and second circuit means for positioning each of said first and second null seeking detector means.

7. X-ray diffraction apparatus for determining the stress in a specimen comprising means for irradiating first and second equivalent crystallographic planes in said specimen,
   first and second detector means responsive respectively to X-rays diffracted from said first and second equivalent crystallographic planes,
   each detector means including first and second radiation detecting tubes,
   first and second circuit means independently responsive to the outputs of said first and second tubes respectively of each of said detector means,
   means responsive to the difference in the output of said first and second circuit means for positioning said first and second detector means respectively,
   and means for detecting the angular position of said first and second detector means for indicating stress.

8. Apparatus in accordance with claim 7 wherein said first and second X-ray beams emanate from first and second X-ray sources respectively and said equivalent crystallographic planes are the (211) martensite planes parallel to and 60° oblique to the surface of the specimen.

9. Apparatus in accordance with claim 7 wherein said first and second circuit means includes a rate meter for developing a D-C output proportional to the intensity detected by said tubes,
   correction circuitry for modifying the D-C outputs of at least one of said rate meters in accordance with the diffraction angle locations of said tubes.

10. Apparatus in accordance with claim 7 wherein the angular position detected is midway between the angular locations of said first and second tubes.

11. Apparatus in accordance with claim 8 wherein said first source and said first detector means and said second source and said second detector means are located on a parafocus circle which is tangential to the surface of the specimen.

12. Apparatus in accordance with claim 11 wherein said first source and said first detector are located on a separate parafocus circle from said second source and said second detector.

13. Apparatus in accordance with claim 12 wherein said first and second detectors are movable along a circle having its center at the point of tangency of said parafocus circles with said specimen.

14. Apparatus in accordance with claim 13 wherein said detectors are movable on concentric circles.

15. X-ray diffraction apparatus for determining stress and percent retained austenite in a specimen containing both martensite and austenite crystalline structure,
   said apparatus comprising means for simultaneously irradiating a common surface area of said specimen with first and second X-ray beams,
   first, second and third relatively movable, independently mounted detector means,
   said first and third detector means being angularly oriented to be responsive to X-rays diffracted from predetermined martensite atomic planes respectively parallel and oblique to the surface of said specimen, said second detector means being angularly oriented with respect to the surface of said specimen to be responsive to X-rays diffracted from predetermined austenite atomic planes, said first, second and third detector means including first and second radiation detecting tubes responsive to X-ray intensity at two discrete diffraction angles, first and second circuit means independently responsive to the outputs of said first and second tubes of said first, second and third detector means, a drive motor responsive to the difference in the output of each of said first and second circuit means for independently positioning said first, second and third detector means respectively to a null position, said first and second detector means including a third radiation detecting tube responsive to X-ray intensity at a diffraction angle midway between said two diffraction angles, fourth detector means including a single radiation detecting tube located at a predetermined diffraction angle and responsive to background intensity, means for detecting the angular null position of said first and third detector means for directly indicating stress in said specimen, and means responsive to the outputs of said third tubes and said single tube for directly indicating percent retained austenite.

16. Apparatus in accordance with claim 15 wherein said predetermined martensite atomic planes are the (211) martensite planes and said predetermined austenite planes are the (220) austenite planes.

17. X-ray diffraction apparatus for determining percent retained austenite in a specimen containing martensite and austenite crystalline structure comprising X-ray radiating means, means supporting said specimen and said X-ray radiating means, first, second and third goniometers rotatably mounted about a common axis, first, second and third detector means mounted on said first, second and third goniometers respectively at predetermined angular orientations relative to the surface of said specimen, said first and third detector means including first, second and third detector tubes, said first and second detector tubes responsive to X-ray intensity at separate diffraction angles, said second detector means including a single detector tube, said third detector tubes being responsive to X-ray intensity at a diffraction angle midway between said separate diffraction angles, first and second control means responsive to the outputs of said first and second tubes of said first and third detector means respectively, said control means including motor means for driving said first and third goniometers to positions where equal corrected intensities are detected by said first and second tubes respectively, and means responsive to the intensities detected by said third tubes and said single tube for indicating percent retained austenite.

18. The apparatus defined in claim 17 wherein said control means includes means for developing a D-C voltage indicative of the output of said first and second tubes of said first and third detectors, means for correcting the D-C voltage output of at least one tube for diffraction angle dependent factors associated with the diffraction angle location of said first and second tubes, servo amplifier means developing an output signal responsive to the difference in the corrected D-C output voltage of said first and second tubes, and servo motor means responsive to the output of said servo amplifier means for driving said first and third goniometers to a null position.

No references cited.

RALPH G. NILSON, *Primary Examiner.*

A. L. BIRCH, *Assistant Examiner.*